(12) United States Patent
Kawasaki et al.

(10) Patent No.: US 7,767,911 B2
(45) Date of Patent: Aug. 3, 2010

(54) GROMMET AND ASSEMBLING METHOD THEREFOR

(75) Inventors: Nozomi Kawasaki, Utsunomiya (JP); Yasuyoshi Serizawa, Utsunomiya (JP); Tatsuo Shimada, Utsunomiya (JP); Tetsuya Mitani, Wako (JP); Hiroyuki Kurokawa, Wako (JP)

(73) Assignees: Yazaki Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/044,061

(22) Filed: Mar. 7, 2008

(65) Prior Publication Data
US 2008/0230257 A1 Sep. 25, 2008

(30) Foreign Application Priority Data
Mar. 19, 2007 (JP) ............................. 2007-070428

(51) Int. Cl.
*H01B 17/58* (2006.01)
(52) U.S. Cl. .................. 174/153 G; 174/660; 174/665; 174/152 G; 174/152 R; 16/2.1; 248/56
(58) Field of Classification Search ......... 174/650–654, 174/660–666, 153 G, 152 G, 152 R; 16/2.1, 16/2.2; 248/56; 277/178; 361/826
See application file for complete search history.

(56) References Cited

U.S. PATENT DOCUMENTS 6,479,748 B2 * 11/2002 Mori ........................ 174/651

6,825,416 B2 * 11/2004 Okuhara ..................... 174/668
7,098,401 B1 * 8/2006 Herald et al. ............... 174/652
7,420,125 B2 * 9/2008 Tsukamoto et al. ..... 174/153 G

FOREIGN PATENT DOCUMENTS

| JP | 6-38339 | 2/1994 |
|---|---|---|
| JP | 6-231642 A | 8/1994 |
| JP | 08-077854 | 3/1996 |
| JP | 10-12071 | 1/1998 |
| JP | 11-063313 | 3/1999 |
| JP | 2002-186153 | 6/2002 |

* cited by examiner

*Primary Examiner*—Dhiru R Patel
(74) *Attorney, Agent, or Firm*—Morgan, Lewis & Bockius LLP

(57) ABSTRACT

A grommet (1) has a central shaft (2)through which a wire harness (5) is inserted. A circular connection portion (31) is provided continuously to the periphery of the central shaft(2.) A convex cross-sectionally V-shaped ring-like lip (32) is extensibly provided to the circular connection portion (31) in the direction of the center of the central shaft. A flange portion (33) is provided continuously to the lip portion (32.) When the grommet (1) is assembled to a body panel (10,) the lip (32) of the grommet (1) is extended in the direction of the center of the central shaft (2) of the grommet (1,) thereby reducing the diameter of the lip (32.) Then, the lip(32) is inserted into the through hole (12) of the body panel (10.) Thus, a low insertion force is sufficient when the grommet is inserted thereinto. Consequently, the assemblability of the grommet (1)is enhanced.

6 Claims, 5 Drawing Sheets

GROMMET AND ASSEMBLING METHOD THEREFOR

BACKGROUND OF THE INVENTION

1. Field of the Invention

The present invention relates to a grommet for protecting a wire harness to be passed through, for example, a through hole formed in a car body panel.

2. Description of Related Art

FIG. 5 is a cross-sectional view exemplifying a related grommet. FIG. 6 is a cross-sectional view illustrating a manner of assembling the grommet shown in FIG. 5.

One such a related grommet 1 has been proposed (see, e.g., Patent Document 1), in which a cap-like elastic expansion portion 3 is concentrically and integrally molded with the periphery of the central shaft 2, as illustrated in FIG. 5. When the grommet 1 is assembled to a body panel 10, the grommet 1 is inserted into a through hole 12 of the body panel 1 by being pushed thereinto in the direction of arrow A, as illustrated in FIG. 6. Then, the elastic expansion portion 3 interferes with and is elastically deformed by the body panel 10. Subsequently, the elastic expansion portion 3 is elastically restored from the deformed state. Thus, the grommet 1 is fit into the through hole 12 of the body panel 10, as shown in FIG. 5.

The related grommet 1 is configured so that the elastic expansion portion 3 has a predetermined lap width L1 with respect to the diameter D1 of the through hole 12 of the body panel 10 (e.g., L1=D1+3 mm) so as to prevent the grommet 1 from being disengaged from the body panel 10 when the wire harness 5 inserted into the central shaft 2 is pulled in the direction of arrow B. Consequently, the related grommet 1 ensures a high holding force.

Patent Document 1: JP-A-06-231642 (Paragraph No. [0023], FIG. 1)

However, in a case where the lap width L1 of the elastic expansion portion 3 is increased to assure the high holding force of the grommet 1, a high insertion force is needed when the grommet 1 is inserted into the through hole 12 of the body panel 10. Thus, the assemblability of the grommet 1 is degraded.

SUMMARY OF THE INVENTION

In view of such circumstances, an object of the invention is to provide a grommet and an assembling method for the grommet, which are enabled to improve assemblability, while ensuring a high holding force.

According to an aspect of the invention, there is provided a grommet (hereunder referred to as a first grommet of the invention), which comprises a central shaft through which a wire harness is inserted. The first grommet of the invention is featured in that a circular connection portion is provided in the central shaft, that a convex cross-sectionally V-shaped ring-like lip is provided continuously from the circular connection portion so as to be extensible and contractible in a direction of a shaft center line of the central shaft, and that a flange portion is provided continuously from the lip.

According to an embodiment (hereunder referred to as a second grommet of the invention) of the first grommet of the invention, the circular connection portion and the lip are connected to each other through a connection rib.

According to another aspect of the invention, there is provided a grommet assembling method for assembling the first or second grommet of the invention to an assembled member, which is featured in that the lip of the grommet is extended in a direction of the shaft center line of the central shaft of the grommet so as to reduce a diameter of the lip, and that the extended lip is inserted into the through hole of the assembled member.

According to the invention, at the assembling of a grommet to a body panel, the reduction of an insertion force can be achieved by reducing the diameter of the lip. In addition, after the assembling of the grommet to the body panel, the grommet can assure a high holding force by increasing the diameter of the lip. Consequently, the assemblability of the grommet can be enhanced, while the high holding force of the grommet is assured.

DESCRIPTION OF THE PREFERRED EMBODIMENTS

Hereinafter, an embodiment of the invention is described with reference to the accompanying drawings.

First Embodiment

Figure 1:
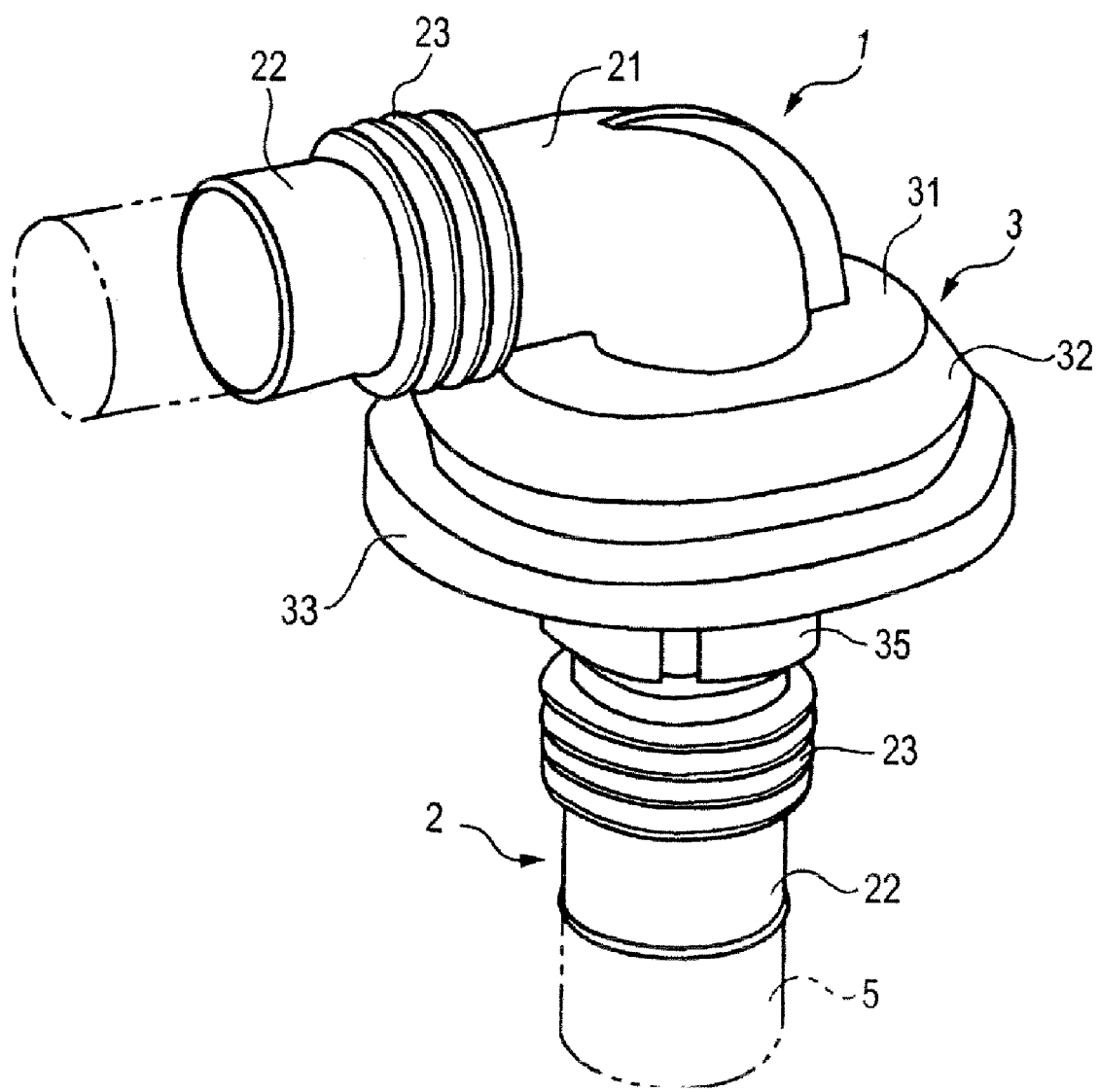
FIG. 1 is a perspective view illustrating an embodiment of a grommet according to the invention.
Figure 2:
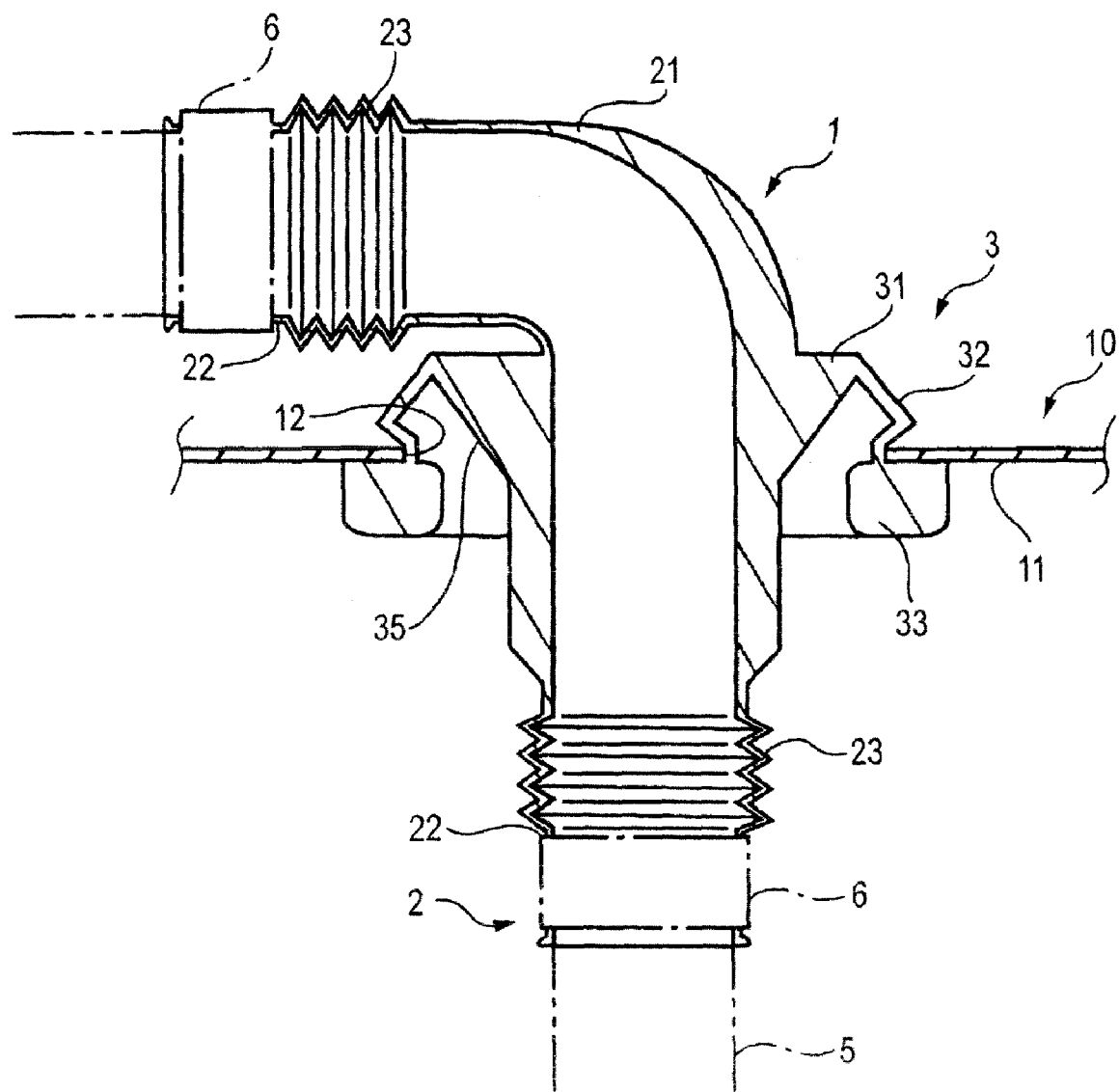
FIG. 2 is a longitudinally cross-sectional view illustrating the grommet shown in FIG. 1.
Figure 3:
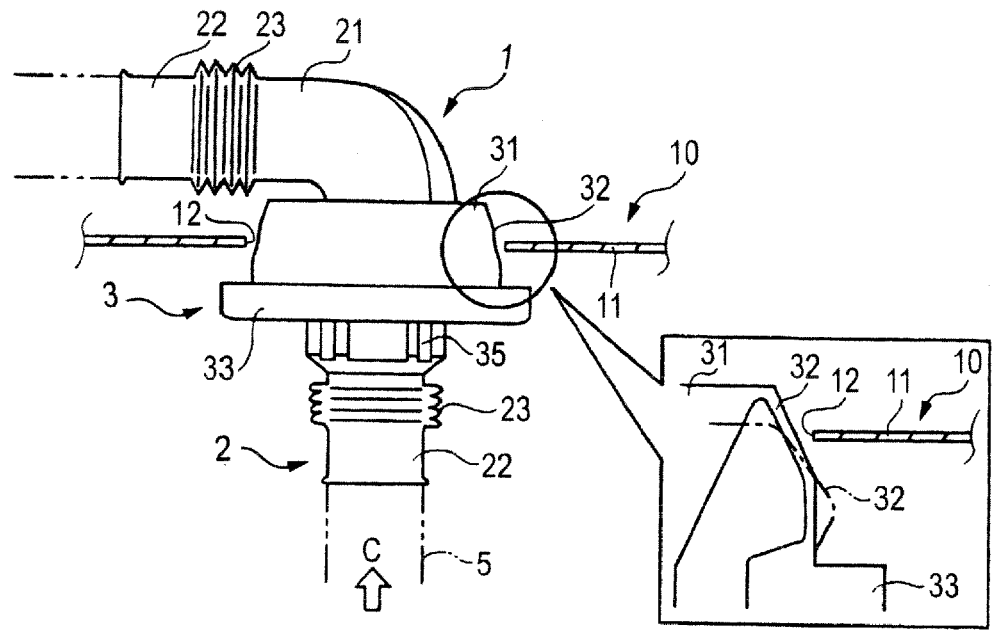
FIG. 3 is a front view illustrating a manner of assembling the grommet shown in FIG. 1.
Figure 4:
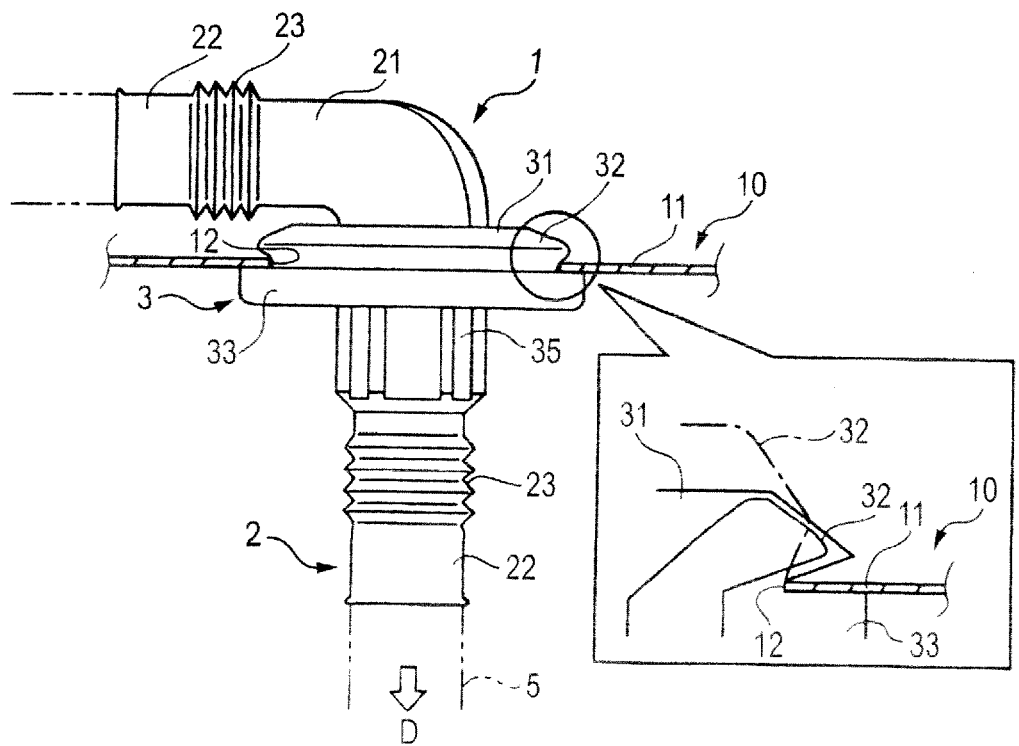
FIG. 4 is a front view illustrating a manner of pulling a wire harness of the grommet shown in FIG. 1.
Figure 5:
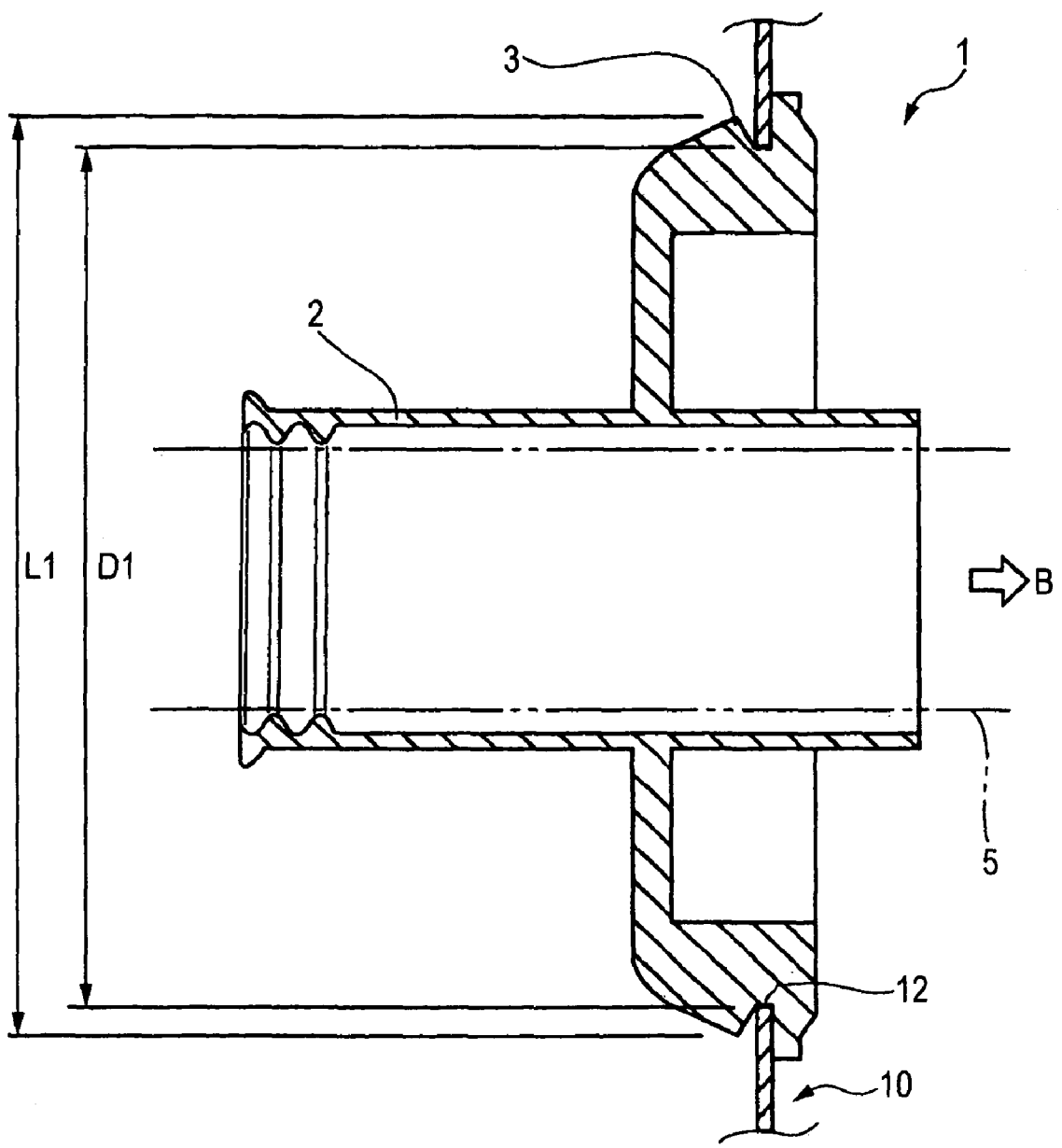
FIG. 5 is a cross-sectional view exemplifying a related grommet.
Figure 6:
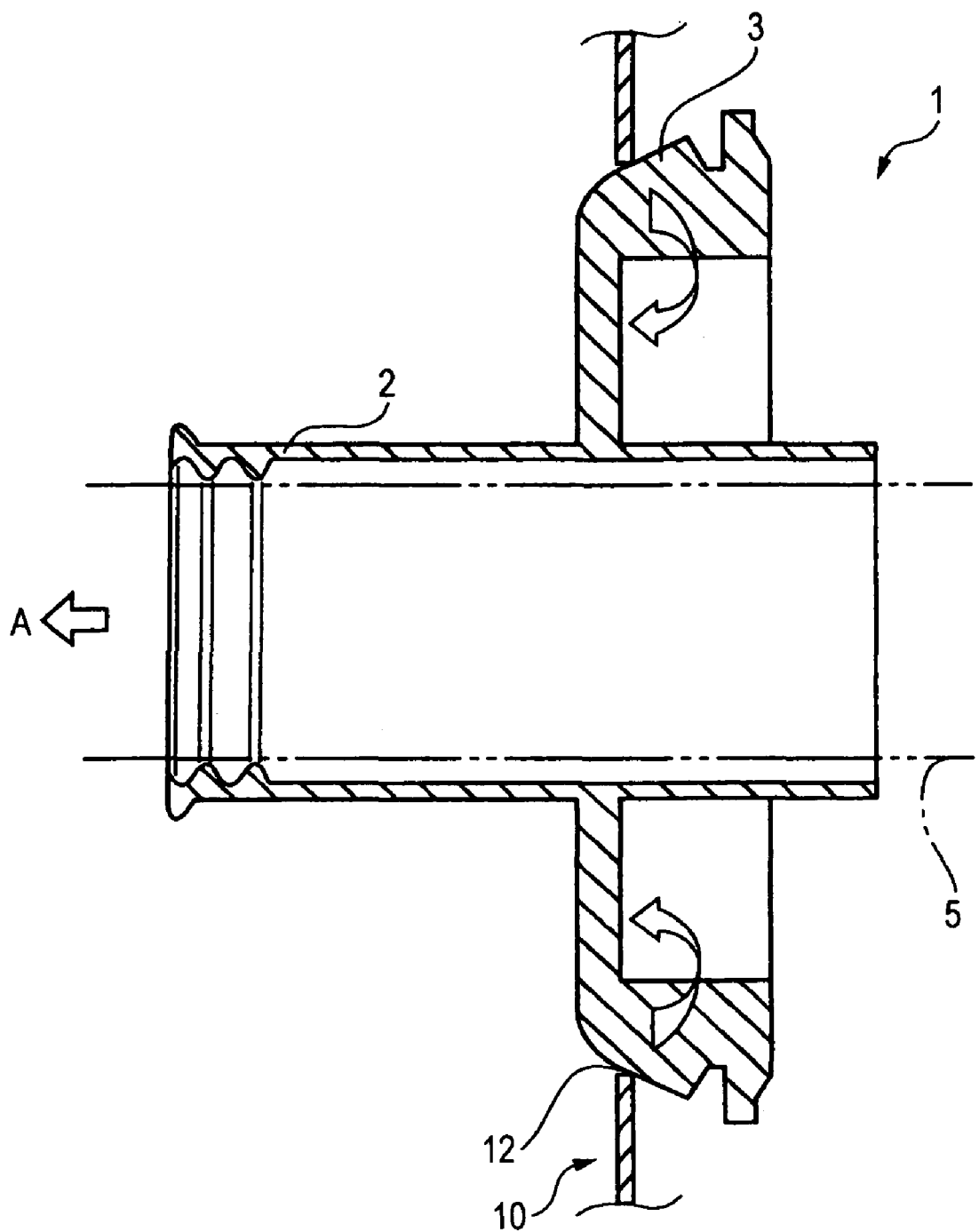
FIG. 6 is a cross-sectional view illustrating a manner of assembling the grommet shown in FIG. 5.

FIG. 1 is a perspective view illustrating an embodiment of a grommet according to the invention. FIG. 2 is a longitudinally cross-sectional view illustrating the grommet shown in FIG. 1. FIG. 3 is a front view illustrating a manner of assembling the grommet shown in FIG. 1. FIG. 4 is a front view illustrating a manner of pulling a wire harness of the grommet shown in FIG. 1.

A grommet 1 is an integrally molded product that is made of an elastic material, such as synthetic rubber or an elastomer. As illustrated in FIG. 1, the grommet 1 includes a central shaft 2 through which a wire harness 5 is inserted, and a cap-like elastic expansion portion 3 concentrically coupled to the periphery of the central shaft 2.

Incidentally, as illustrated in FIGS. 1 and 2, the central shaft 2 has a cylindrical L-shaped body 21. Tape stopper portions 22, around each of which tape is wound, are formed at both ends of the body 21, respectively. Further, in the vicinities of both ends of the body 21, bellows portions 23 are formed slightly to the middle of the body 21 from the tape stopper portions 22, respectively.

On the other hand, as illustrated in FIGS. 1 and 2, the elastic expansion portion 3 has a circular connection portion 31 that is provided continuously from the periphery of the body 21 of the central shaft 2, and that is elliptic-ring-shaped. The circular connection portion 31 has high rigidity and is positioned on a plane perpendicular to the shaft center line of the central shaft 2. A convex cross-sectionally V-shaped ring-like lip 32 is provided continuously from the peripheral edge of the circular connection portion 31 so as to be foldably extensible in the direction of the shaft centre line of the central shaft 2. The lip 32 is coupled to the circular connection portion 31 through a connection rib 35. Additionally, a thick elliptic-ring-shaped flange portion 33 is provided continuously from the lip 32 so as to be located on a plane perpendicular to the shaft centre line of the central shaft 2. Incidentally, the shape of the lip 32, that is, the convex cross-sectionally V-shaped ring-like shape thereof means that the central portion of the lip 32 has an outwardly expanded V-shaped cross-sectional shape.

As illustrated in FIG. 2, the body panel (i.e., an assembled member) 10 has a planar substrate 11. A circular through hole 12 is bored in the substrate 11. Incidentally, burring of the through hole 12 of the body panel 10 is not performed.

The grommet 1 has the aforementioned configuration. Thus, the assemblability can be enhanced by reducing an insertion force at the time of assembling of the grommet to a low level. That is, as illustrated in FIG. 2, when the grommet 1 is assembled to the body panel 10, the wire harness 5 is inserted through the central shaft 2 of the grommet 1 and is fixed to the tape stopper portion 22 with tape. In this state, the grommet 1 is inserted into the through hole 12 of the body panel 10 by being pushed to an interior side (i.e., an upper side, as viewed in FIG. 3) of the body panel 10 in the direction of arrow C from an exterior side (i.e., a lower side, as viewed in FIG. 3), as illustrated in FIG. 3. Thus, the flange portion 33 abuts against the substrate 11 of the body panel 10. In this state, the grommet 1 is inserted thereinto still more in the direction of arrow C. Then, as the grommet 1 is gradually inserted thereinto, the body 21 of the central shaft 2 rises to the interior side of the body panel 10, together with the circular connection portion 31, while the flange portion 33 abuts against the substrate 11 of the body panel 10. At that time, because the circular connection portion 31 has high rigidity, as described above, not only the central portion, from which the body 21 of the central shaft 2 is provided continuously, but the peripheral portion of the circular connection portion 31, that is, the entire circular connection portion 31 is pushed up by a distance equal to that of displacement of the body 21 of the central shaft 2. Thus, the convex cross-sectionally V-shaped ring-like lip 32 is extended in the direction of the shaft centre line of the central shaft 2, thereby reducing the diameter of the lip 32. At that time, because the lip 32 has a convex cross-sectionally V-shaped ring-like shape, a diameter reducing operation of the lip 32 is foldably and smoothly performed. Consequently, the grommet can be inserted into the through hole with a low insertion force. Accordingly, the assemblability of the grommet 1 can be enhanced. Incidentally, because the lip 32 is connected to the circular connection portion 31 through the connection rib 35, a diameter reducing operation of the lip 32 is uniformly performed over the entire circumference thereof.

The grommet 1 can ensure a high holding force after assembled to the body panel 10. That is, in a case where the grommet 1 is pulled toward the exterior side of the body panel 10, that is, in the direction of arrow D, as illustrated in FIG. 4, in a state in which the grommet 1 is assembled to the body panel 10, the circular connection portion 31 is pulled downwardly toward the exterior side of the body panel 10. Thus, the convex cross-sectionally V-shaped ring-like lip 32 is crushed in the direction of the shaft center line of the central shaft 2, so that the grommet 1 is increased in diameter. At that time, because the lip 32 has a convex cross-sectionally V-shaped ring-like shape, a diameter increasing operation of the lip 32 is smoothly and foldably performed. Consequently, the interference area between the through hole 12 of the body panel 10 and the lip 32 is increased. Accordingly, the holding force of the grommet 1 is increased. In addition, even when a lap width of the lip 32 is increased in order to ensure the high holding force of the grommet 1, the reduction of the insertion force at the assembling of the grommet 1 to the body panel 10 can be achieved due to the reduction of the diameter of the lip 32. Therefore, the assemblability of the grommet 1 can be enhanced by simultaneously ensuring the high holding force of the grommet 1. Incidentally, the lip 32 is connected to the circular connection portion 31 through the connection rib 35. Thus, a diameter increasing operation of the lip 32 is uniformly performed over the entire circumference thereof.

Meanwhile, in a case where the grommet 1 is pulled toward the interior side (i.e., the upper part, as viewed in FIG. 4) of the body panel 10 in a state in which the grommet 1 is assembled to the body panel 10, the flange portion 33 abuts against the body panel 10 so as to resist a pulling force of pulling the grommet 1 toward the interior side of the body panel 10. Consequently, there is no possibility that the grommet 1 may slip off to the interior side of the body panel 10.

Other Embodiments

In the foregoing description of the embodiments, it has been described that when the grommet 1 is inserted into the through hole 12 of the body panel 10, the grommet 1 is inserted thereinto from the exterior side of the body panel 10. However, the invention can be applied to a case where the grommet 1 is pulled thereinto from the exterior side of the body panel 10.

In the foregoing description of the embodiments, it has been described that the burring of the through hole 12 of the body panel is not performed. Apparently, the invention can be applied to a case where the burring of the through hole 12 of the body panel is performed.

In the foregoing description of the embodiments, it has been described the case where the assembled member, to which the grommet 1 is assembled, is the body panel 10. However, assembled members other than the body panel 10 (e.g., a partition wall of a manufacturing plant, a casing of an electric appliance, and a housing of office automation (OA) equipment) can be substituted for the body panel 10.

The invention can be applied to various industrial fields such as automobiles, airplane, electric trains, manufacturing plants, electric appliances, and OA equipment.

What is claimed is:

1. A grommet, comprising:
   a central shaft through which a wire harness is inserted;
   a circular connection portion provided with said central shaft;
   a ring-shaped lip provided so as to be continued from said connection portion, the lip being convex cross-sectionally V-shaped so as to be extensible and contractible in a direction of a shaft centre line of said central shaft; and
   a flange portion provided so as to be continued from said lip,
   wherein the flange portion is formed with a ring shaped projection part projected toward the shaft centre line of said central shaft from a part of an inner surface of the lip that is contacted with the flange.

2. The grommet according to claim 1, wherein said connection portion is rigid.

3. The grommet according to claim 1, wherein said connection portion and said lip are connected to each other through a connection rib.

4. A grommet assembling method for assembling said grommet according to claim 1 to an assembled member,
   wherein said lip of said grommet is extended in said direction of said shaft center line of said central shaft so as to reduce a diameter of said lip; and said extended lip is inserted into a through hole of said assembled member.

5. The grommet according to claim 1, wherein the lip is foldably extensible and contractible in the direction of the shaft centre line of said central shaft.

6. The grommet according to claim 1, wherein the grommet is formed by a single piece.

* * * * *